(12) United States Patent
Bortoli

(10) Patent No.: US 7,014,447 B2
(45) Date of Patent: Mar. 21, 2006

(54) EXTRUDER FOR WELDING PLASTIC COMPONENTS

(75) Inventor: Renzo Bortoli, Torreglia (IT)

(73) Assignee: Ritmo S.p.A., Teolo (IT)

( * ) Notice: Subject to any disclaimer, the term of this patent is extended or adjusted under 35 U.S.C. 154(b) by 0 days.

(21) Appl. No.: 10/998,346

(22) Filed: Nov. 3, 2004

(65) Prior Publication Data

US 2005/0129796 A1    Jun. 16, 2005

(30) Foreign Application Priority Data

Dec. 16, 2003 (IT) .......................... PD2003A0301

(51) Int. Cl.
*B29B 13/00* (2006.01)
*B29C 47/36* (2006.01)

(52) U.S. Cl. .................. 425/208; 425/202; 425/376.1; 425/378.1; 366/81; 366/158.3

(58) Field of Classification Search ................ 425/202, 425/208, 376.1, 378.1; 366/81, 158.3
See application file for complete search history.

(56) References Cited

U.S. PATENT DOCUMENTS

| | | | |
|---|---|---|---|
| 1,949,658 A * | 3/1934 | Remseth et al. ............ 392/476 |
| 3,698,844 A * | 10/1972 | Grimm ........................ 425/144 |
| 3,743,142 A * | 7/1973 | Elliott et al. .............. 222/146.5 |
| 4,262,737 A * | 4/1981 | Faillace ....................... 165/267 |
| 5,558,886 A * | 9/1996 | Martinez-Bustos et al. ....... 425/376.1 |
| 5,671,321 A * | 9/1997 | Bagnuolo .................... 392/385 |
| 6,854,873 B1 * | 2/2005 | Rothemeyer ................. 366/80 |

* cited by examiner

Primary Examiner—Robert Davis
Assistant Examiner—G. Nagesh Rao
(74) *Attorney, Agent, or Firm*—Modiano & Associati; Albert Josif; Daniel O'Byrne

(57) ABSTRACT

An extruder for welding plastic components, comprising a front part for plasticizing and ejecting additional plastic welding material, and a rear part, for feeding and breaking up a continuous filament made of the additional plastic material. The rear part comprises a feed channel that cooperates with a worm screw for the advancement of the filament. The feed channel is delimited by the thread of the worm screw on one side and by a sliding surface for the filament on the opposite side. The distance between the sliding surface and the crest of the thread decreases in the direction in which the filament is fed, in order to provide scoring of increasing depth on the filament. The thread comprises at least one discontinuity of the worm that has a sharp discontinuity end for cropping the filament at the scoring.

13 Claims, 3 Drawing Sheets

EXTRUDER FOR WELDING PLASTIC COMPONENTS

The present invention relates to an extruder for welding plastic components.

BACKGROUND OF THE INVENTION

Various methods are known for welding plastic components, such as for example containment tanks and other types of special article.

One of the most widely used methods is welding with added material and is performed by means of an extruder composed of a front part, for plasticizing and ejecting plastic material to be added to the weld, and by a rear part for feeding and breaking up a continuous filament made of the additional material.

The front part, for plasticizing and ejection, generally comprises a plasticizing chamber, inside which the small pieces of plastic filament that originate from the rear part are melted and moved by means of a screw feeder toward an ejection nozzle.

Electric resistors for heating and melting the small pieces of filament are arranged around the plasticizing chamber.

The rear part generally comprises a cylindrical feed chamber, in which a worm screw is arranged coaxially.

A feed channel is provided between the thread of said worm screw and the wall of the cylindrical chamber.

The distance between the crest of the thread and the wall of the cylindrical chamber is shorter than the diameter of the plastic filament and accordingly the thread engages said filament.

The rotary motion of the worm screw (actuated by an electric motor) allows the filament to advance inside the feed channel until it reaches the plasticizing chamber.

At the end of the rear part, substantially at the end of the worm screw, there are generally elements for cutting the filament into many small pieces that will feed the plasticizing chamber.

The known extruders described here, although being known and used extensively on the market, are not free from drawbacks and aspects that can be improved.

A first drawback is that said cutting elements arranged at the end of the rear part do not provide uniform filament pieces, and this causes a less than optimum flow of additional welding material, since said material is not melted correctly.

A second drawback is linked to the fact that the rotating components, i.e., the screw feeder and the worm screw, must have a very precise axial tolerance, since any friction would damage the individual components, including the element that transmits rotary motion (which, if subjected to stresses caused by unexpected friction, is easily damaged or becomes noisy and tends to reduce its operating cycle); it should be noted, in this regard, that these extruders are subjected to very long and accordingly very demanding work cycles.

Another drawback is that the first part of the plasticizing chamber may overheat.

Overheating in this region can lead to an expansion of the rotating elements beyond the allowed tolerances and to consequent friction and malfunctions.

SUMMARY OF THE INVENTION

The aim of the present invention is to provide an extruder for welding plastic components that solves the drawbacks noted in known types.

Within this aim, an object of the present invention is to provide an extruder for welding plastic components that allows to provide small pieces of filament of additional welding material that have mutually uniform dimensions.

Another object of the present invention is to provide an extruder for welding plastic components that allows to ensure a correct axial tolerance of the rotating elements.

Another object of the present invention is to provide an extruder for welding plastic components that allows to avoid overheating of the rotating elements.

Another object of the present invention is to provide an extruder for welding plastic components that can be manufactured with known systems and technologies.

This aim and these and other objects that will become better apparent hereinafter are achieved by an extruder for welding plastic components, which comprises a front part for plasticizing and ejecting additional plastic welding material, and a rear part, for feeding and breaking up a continuous filament made of said plastic material, said rear part comprising at least one feed channel that cooperates with a worm screw, said at least one feed channel being delimited by the thread of said worm screw on one side and by a sliding surface for said filament on the opposite side, said extruder being characterized in that the distance between said sliding surface and the crest of said thread decreases in the direction in which said filament is fed, in order to provide scoring of increasing depth on said filament, said thread comprising at least one discontinuity of the worm that has a sharp discontinuity end for cropping said filament at said scoring.

BRIEF DESCRIPTION OF THE DRAWINGS

Further characteristics and advantages of the present invention will become better apparent from the following detailed description of a preferred but not exclusive embodiment thereof, illustrated by way of non-limiting example in the accompanying drawings, wherein.

DESCRIPTION OF THE PREFERRED EMBODIMENTS

Figure 1:
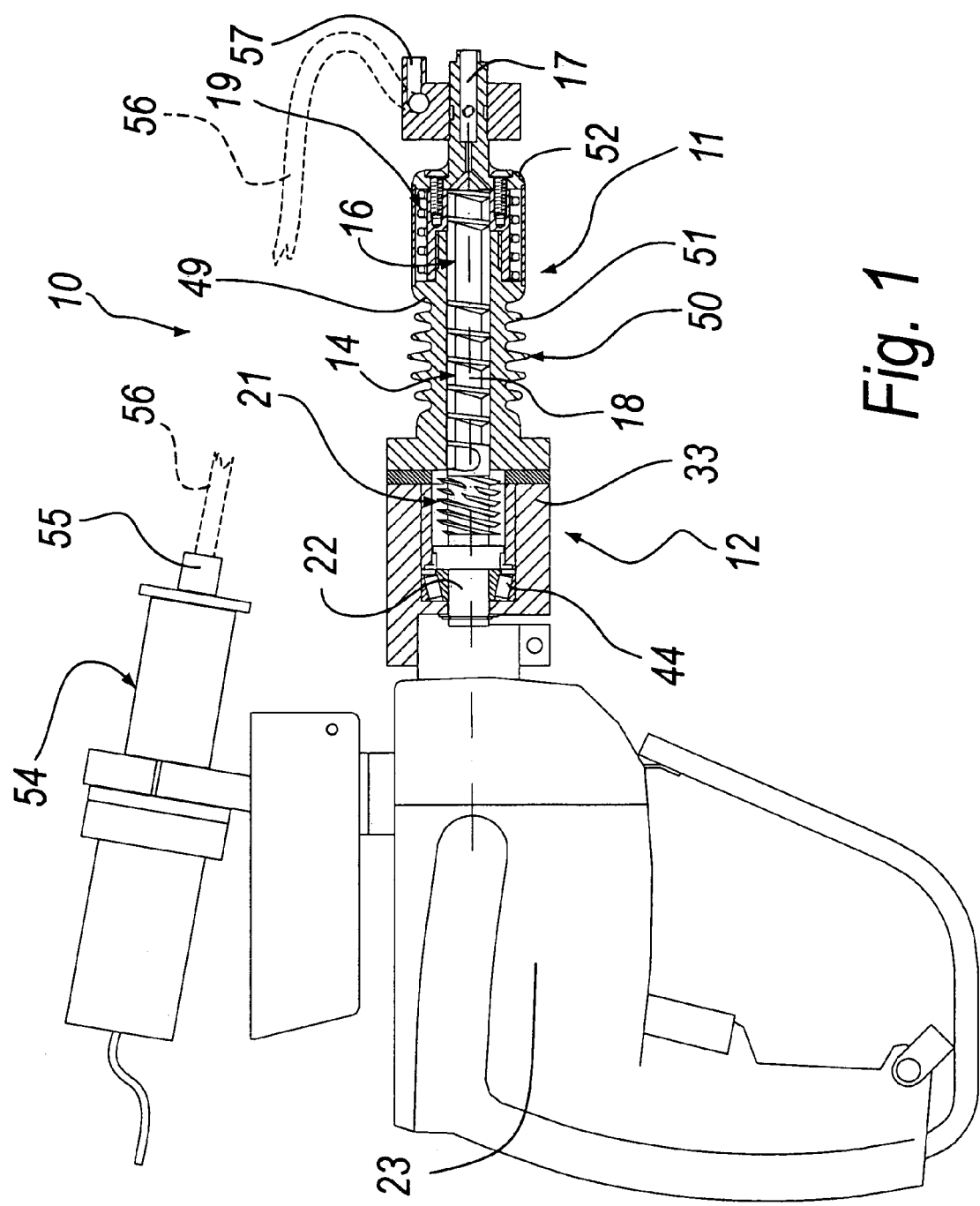
FIG. 1 is a partially sectional side view of an extruder according to the invention.
Figure 2:
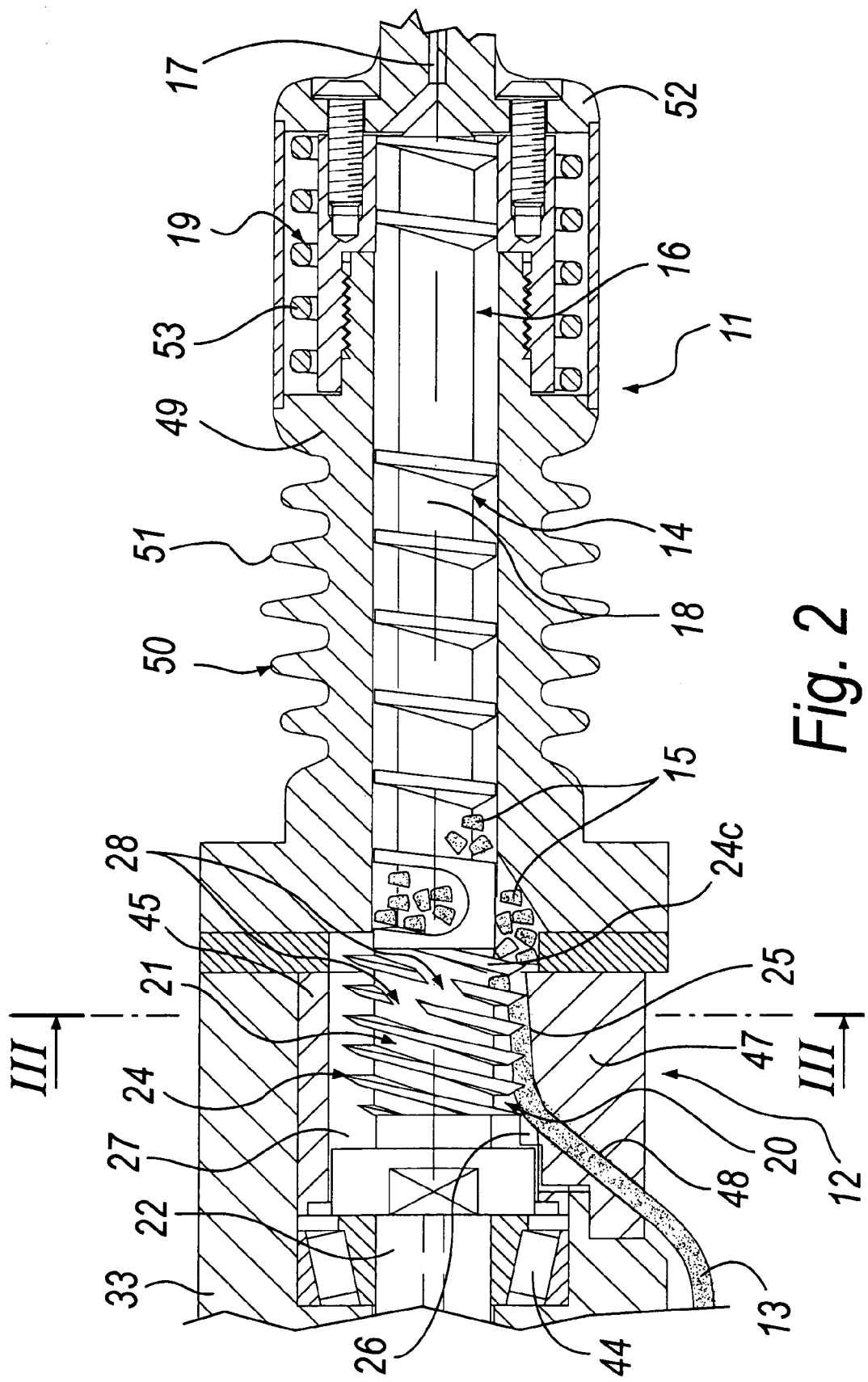
FIG. 2 is an enlarged-scale partially sectional plan view of a portion of the extruder of FIG. 1.
Figure 3:
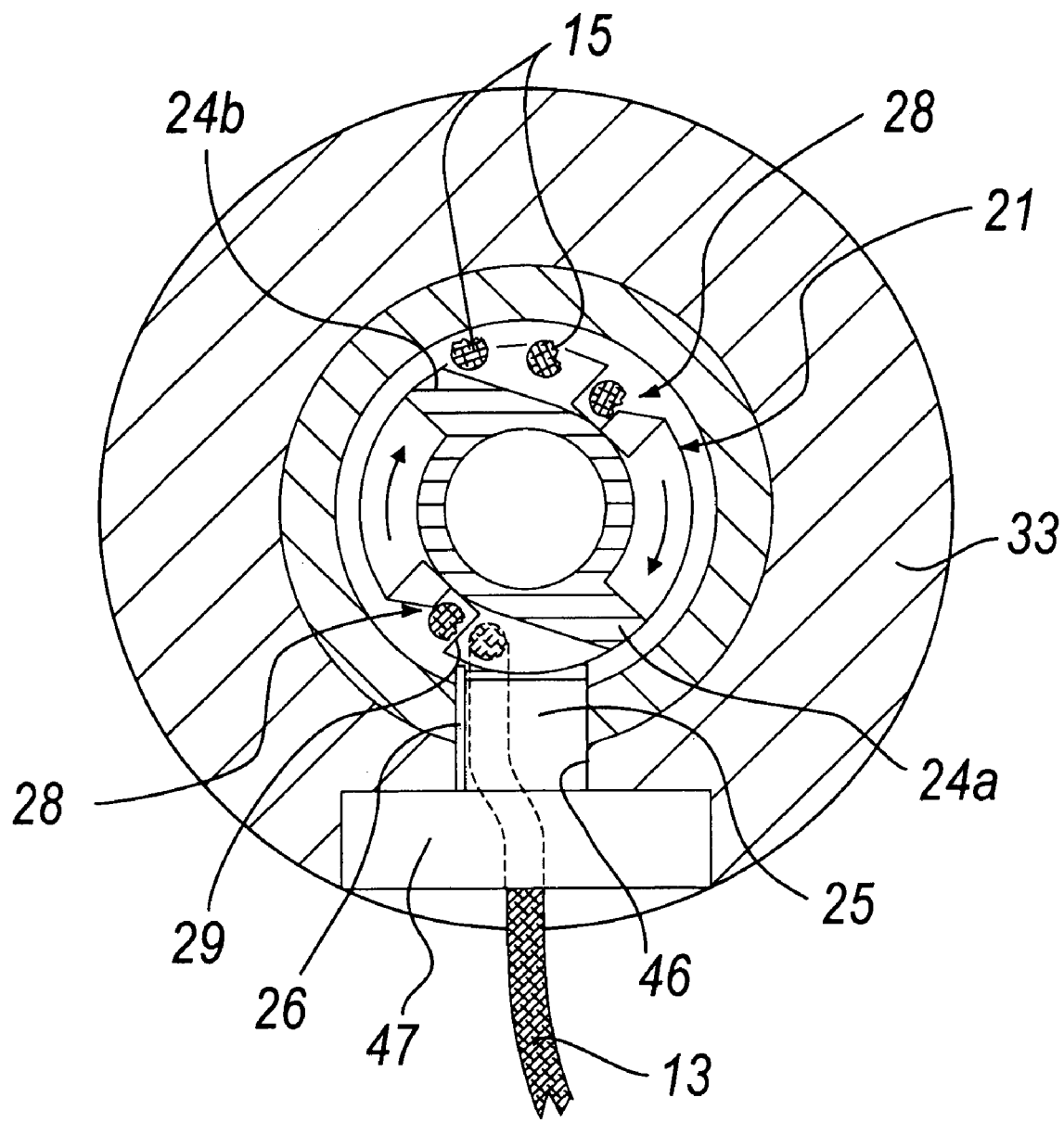
FIG. 3 is a transverse sectional view of the extruder, taken along the line III—III of FIG. 2.

With reference to the figures, an extruder for welding plastic components according to the invention is generally designated by the reference numeral 10.

The extruder 10 comprises a front part 11, for plasticizing and ejecting plastic material to be added to the weld, and a rear part 12, for feeding and breaking up a continuous filament, here designated by the reference numeral 13, made of the plastic material of the additional welding material.

The front part 11 comprises a chamber 14 for transferring small pieces of plastic filament, generally designated by the reference numeral 15, from the rear part 12 to a melting chamber 16 that is located proximate to an ejection duct 17.

The transfer chamber 14 is substantially cylindrical and comprises internally a screw feeder 18, which moves the small filament pieces 15 toward the melting chamber 16 and the ejection duct 17.

The melting chamber 16 comprises electric resistor means 19, which will be described hereinafter.

The rear part 12, for feeding and breaking up the continuous filament 13, comprises a feed channel 20, which cooperates with a worm screw 21.

The worm screw 21 is rigidly fixed coaxially at the rear end of the screw feeder 18, and is fixed coaxially to a rotation shaft 22 that protrudes from a motor drive, for example an electric one (not designated by reference numerals in the figures for the sake of simplicity), which is embedded in a casing 23 of the extruder 10; the casing 23 and the motor drive are, for example, the typical ones of an ordinary portable drill.

It is evident that the motor drive can be of any kind, electrical, pneumatic, hydraulic, et cetera, depending on the requirements and applications.

The feed channel 20 is delimited by a thread or thread part 24 of the worm screw 21 on one side and by a sliding surface 25 for the filament 13 on the opposite side.

The distance between the sliding surface 25 and the crest of the thread 24 decreases in the feeding direction of the filament 13.

In particular, in this embodiment, the thread 24 is substantially cylindrical, while the sliding surface 25 is inclined so as to converge toward the thread 24 in the feeding direction of the filament 13.

The fact that the distance between the crest of the thread 24 and the sliding surface 25 decreases in the feeding direction of the filament 13 causes the filament 13 to be scored by the worms.

The rotary motion of the worm screw 21 causes the advancement of the filament 13 and the scoring increases in depth as the filament advances.

In order to optimize the advancement of the filament 13, a shoulder 26 for guiding the filament 13 is formed on the sliding surface 25 and contrasts the lateral thrust produced by the rotation of the worm screw 21.

The thread 24 is composed of, or has, in this embodiment, two separate worm starts 24a and 24b, which are mutually parallel.

The depth of the roots of the thread 24 is greater than the diameter of the filament that can be used in the extruder.

Advantageously, the thread 24 comprises discontinuities or interruption zones 28 of the thread with the starts 24a and 24b.

These discontinuities 28 are formed on the extension of the thread 24 along a common continuous line that is transverse to said thread and with a preset pitch.

Each discontinuity 28 has a sharp discontinuity end for cropping the thread 13 at the scoring produced during advancement.

When, during the rotation of the worm screw 21, the filament 13 encounters the first discontinuity 28 of the thread 24, said filament tends to move toward the rotation axis of the worm screw 21, since the pressure applied in that point by the thread is not present.

Accordingly, since the depth of the roots of the thread 24 is greater than the diameter of the filament 13, said filament, by moving toward the axis, enters fully the root of the thread 24; in this manner, a sharp discontinuity end 29 of the first discontinuity 28, by rotating, crops the part of the filament 13 that is not scored.

If for any reason (flash of the filament, unexpected slippages, unexpected stretching, less than optimum previous scoring, dirt, et cetera), the sharp discontinuity end 29 does not crop the filament 13 with the first of the discontinuities 28, cropping can be attempted on the next discontinuity.

The last of the discontinuities 28, not shown in the figures, is formed on a portion 24c of the thread 24 that does not lie above, i.e. lies away from, the sliding surface 25 and intersects (or is at least tangent to) an ideal or imaginary continuation surface of the sliding surface 25.

The roots of the thread 24, in this embodiment, have a square cross-section, while the crests have a sawtooth cross-section.

A thread of this type can be provided, for example, by superimposing two successive machining operations: a first milling with a square-head tool, superimposed on a more superficial milling with a sawtooth plate.

As regards the overall structure of the rear part 12, it comprises a cylindrical sleeve 33, which is associated with the casing 23 coaxially to the rotation axis of the rotation shaft 22 of the motor drive.

On the bottom of the cylindrical sleeve 33 there is an axial conical roller bearing 44, on which the rotation shaft 22 that protrudes from the motor drive is keyed.

A tubular bush 45 is arranged adjacent to the inner walls of the cylindrical sleeve 33 and forms a rotation chamber 27 for the worm screw 21.

The tubular bush 45 forms a longitudinal space 46 for the insertion of a block 47 on which the sliding surface 25 and the shoulder 26 are formed.

A duct 48 for access of the filament 13 to the feed channel 20 is formed in the block 47.

Since the worm screw 21 is rigidly and coaxially fixed at the rear end of the screw feeder 18, and since said screw feeder is fixed coaxially to the rotation shaft 22, the rotation axis of the screw feeder 18 coincides with the axis of the rotation shaft 22 and therefore with the conical roller-type axial bearing 44.

As regards the front part 11, it is constituted by a tubular body 49, in which the transfer chamber 14 and part of the melting chamber 16 are formed.

The transfer chamber 14 is substantially cylindrical and comprises internally the screw feeder 18 that moves the small pieces of filament 15 toward the melting chamber 16 and the ejection duct 17.

Advantageously, the transfer chamber 14 comprises heat dissipation means 50, which are constituted by heat dissipation fins 51 formed on the outer surface of the transfer chamber 14.

The melting chamber 16 is constituted by the end part of the tubular body 49, to which an end cap 52 is coupled; the ejection duct 17 is further formed on the end cap 52.

The melting chamber 16, as mentioned, comprises electric resistor means 19, which are advantageously constituted by a helical resistor 53, of the type known commercially by the name "Rotfil", which is coaxial to the melting chamber 16.

A heating fan 54 is arranged on the upper part of the casing 23, and its output duct 55 is connected, by means of a tube 56, to an output connector 57, which is arranged proximate to an injection nozzle 58 of the extruder 10.

The heating fan 54 allows to heat the parts of the components to be welded that are in mutual contact.

In practice, it has been found that the invention thus described solves the problems noted in known types of extruder for welding plastic components; in particular, the present invention provides an extruder for welding plastic components that allows to extrude extremely uniform additional welding material.

The scoring formed on the fed filament by means of the worm screw and the subsequent cropping at said scoring due to the discontinuities of the thread of said worm screw in fact allow to obtain small pieces of filament which are regular and which, in the melting chamber, are able to melt in an optimum manner, obtaining in output from the extruder an extremely uniform additional welding material, with consequent improved quality of the weld.

Moreover, the present invention provides an extruder for welding plastic components that allows to ensure a correct axial tolerance of the rotating elements.

The use of an axial bearing of the conical roller type in fact allows to maintain perfectly the axial arrangement of the rotation shaft and therefore of the rotation elements that are derived from it and coaxial to it. Said bearing utilizes the contrasting thrust imparted to said bearing that is generated during the compression of the plastic material while it is plasticizing. The initial part of the rotation shaft is therefore pushed directly toward the cone of the bearing.

Moreover, the present invention provides an extruder for welding plastic components that allows to avoid overheating of the rotating elements.

The heat dissipation fins provided on the outer surface of the transfer chamber in fact allow, in a simple and cheap way, optimum heat dissipation in the main work area of the screw feeder, preventing it from overheating and also preventing the overheating of the tubular body that forms the transfer chamber in which the screw feeder acts. In this manner, dangerous expansions are avoided.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2003A000301 from which this application claims priority are incorporated herein by reference.

What is claimed is:

1. An extruder for welding plastic components, having a front part for plasticizing and ejecting additional plastic welding material, and a rear part for feeding in a feeding direction and breaking up a continuous filament made of said additional plastic material; said rear part comprising: at least one feed channel and a worm screw arranged therein, said at least one feed channel being delimited by a thread of said worm screw on a first side thereof and by a sliding surface for said filament on a second opposite side thereof, and wherein a distance between said sliding surface and a crest of said thread decreases in the feeding direction along which said filament is fed, in order to provide scoring of increasing depth on said filament, said thread comprising at least one discontinuity of the worm thread that has a sharp discontinuity end for cropping said filament at said scoring.

2. The extruder of claim 1, wherein said thread comprises two separate thread starts, which are mutually parallel, said separate thread starts having at least two said worm thread discontinuities formed on an extension of said thread along a common continuous line that is transverse with respect to said thread.

3. The extruder of claim 2, wherein the last one of said discontinuities is formed on a portion of said thread that lies away from said sliding surface and intersects, or is at least tangent to, an imaginary continuation surface of said sliding surface.

4. The extruder of claim 3, wherein said thread is substantially cylindrical, while said sliding surface is inclined so as to converge toward said thread in the feeding direction of said filament.

5. The extruder of claim 1, comprising a shoulder for guiding said filament that is provided on said sliding surface and contrasts lateral thrust due to rotation of said worm screw.

6. The extruder of claim. 1, wherein said thread has roots with a square cross-section, said crests having a sawtooth cross-section, and a depth of said roots of said thread being greater than a diameter of said filament.

7. The extruder of claim 1, wherein said rear part comprises: a casing with a motor drive and a sleeve connected to said casing for actuating in rotation said worm screw; a rotation shaft accommodated in said sleeve and protruding from said motor drive and being rigidly fixed to said worm screw; an axial bearing of a conical roller type arranged at a bottom region of said cylindrical sleeve, said rotation shaft that protrudes from said motor drive being keyed on said bearing; a tubular bush being arranged adjacent to internal walls of said cylindrical sleeve and forming a rotation chamber for said worm screw; a longitudinal space being formed on said tubular bush; a block on which said sliding surface and said shoulder are formed, said block being insertable in said longitudinal space; and a duct for access of said filament to said feed channel that is formed in said block.

8. The extruder of claim 1, wherein said front part comprises a tubular body, having formed therein a transfer chamber; a screw feeder accommodated in said transfer chamber for feeding small pieces of said filament; and a melting chamber, said transfer chamber comprising a heat dissipation means which is constituted by heat dissipation fins formed on an outer surface of said transfer chamber.

9. The extruder of claim 1, wherein said front part comprises a tubular body; a melting chamber accommodated in said tubular body; and electric resistor means constituted by a helical resistor provided in said melting chamber.

10. The extruder of claim 1, further comprising a heating fan with an output duct; a tube; an output connector; an injection nozzle, said output duct being connected through said tube to said output connector that is arranged proximate to said injection nozzle.

11. The extruder of claim 1, wherein said front part comprises: an ejection duct; a screw feeder for the small pieces of plastic filament that are fed in said feeding direction from said rear part toward the ejection duct; an axial bearing of a conical roller type; and a rotation shaft; and wherein a rotation axis of said screw feeder coincides with an axis of said rotation shaft, which is keyed on said axial bearing.

12. The extruder of claim 1, wherein said front part comprises: an ejection duct; a melting chamber that is proximate to the ejection duct; a transfer chamber; a screw feeder located in said transfer chamber for transferring the small pieces of plastic filament along said feeding direction from said rear part, said transfer chamber comprising heat dissipation means, which are constituted by heat dissipation fins formed on an outer surface of said transfer chamber.

13. The extruder of claim 1, wherein said front part comprises: a melting chamber for the small pieces of plastic filament that are fed along said feeding direction from said rear part; electric resistor means provided in said melting chamber for melting said small pieces of filament, said electric resistor means comprising a helical resistor mounted in said melting chamber coaxial to said melting chamber.

* * * * *